United States Patent [19]
Nakamura et al.

[11] Patent Number: 5,010,286
[45] Date of Patent: Apr. 23, 1991

[54] METHOD OF SYNCHRONOUS CONTROL OF SPINDLE MOTOR AND FEED MOTOR

[75] Inventors: Kosei Nakamura; Shinichi Kono; Kazuhisa Numai; Masami Kimijima, all of Yamanashi, Japan

[73] Assignee: Fanuc Ltd., Yamanashi, Japan

[21] Appl. No.: 365,158

[22] PCT Filed: Sep. 9, 1988

[86] PCT No.: PCT/JP88/00907
§ 371 Date: May 8, 1989
§ 102(e) Date: May 8, 1989

[87] PCT Pub. No.: WO89/02618
PCT Pub. Date: Mar. 23, 1989

[30] Foreign Application Priority Data

Sep. 14, 1987 [JP] Japan ................. 62-228514

[51] Int. Cl.$^5$ ............................................ G05B 19/18
[52] U.S. Cl. ................................. 318/571; 318/39; 318/573; 318/569; 364/474.15; 364/474.3
[58] Field of Search .............................. 318/560–638, 318/436, 433, 432, 430; 364/167.01, 474, 513; 408/3, 10, 13, 124, 129

[56] References Cited

U.S. PATENT DOCUMENTS

| | | | |
|---|---|---|---|
| 3,621,348 | 11/1971 | Uchida | 318/77 |
| 4,053,819 | 10/1977 | Matsumoto | 318/569 X |
| 4,151,452 | 4/1979 | Yonescu | 318/654 X |
| 4,279,013 | 7/1981 | Cameron et al. | 318/571 X |
| 4,317,176 | 2/1982 | Saar et al. | 318/434 X |
| 4,346,444 | 8/1982 | Schneider et al. | 318/571 X |
| 4,353,018 | 10/1982 | Kohzai et al. | 318/571 |
| 4,550,277 | 10/1985 | Carney | 318/434 X |
| 4,617,498 | 10/1986 | Ruppert | 318/638 X |
| 4,628,233 | 12/1986 | Bradus | 318/434 X |
| 4,629,956 | 12/1986 | Nozawa et al. | 318/625 |
| 4,692,071 | 9/1987 | Hirota | 318/39 X |
| 4,706,003 | 11/1987 | Nakashima et al. | 318/615 X |
| 4,712,052 | 12/1987 | Omae et al. | 318/625 |
| 4,761,597 | 8/1988 | Saaki et al. | 318/625 |
| 4,813,821 | 3/1989 | Hirota | 318/39 X |
| 4,841,211 | 6/1989 | Neko | 318/434 X |
| 4,879,660 | 11/1989 | Asakura et al. | 318/39 X |

FOREIGN PATENT DOCUMENTS 59-175920 10/1984 Japan.
60-207910 10/1985 Japan.
61-159391 7/1986 Japan.

*Primary Examiner*—Paul Ip
*Attorney, Agent, or Firm*—Armstrong, Nikaido, Marmelstein, Kubovcik & Murray

[57] ABSTRACT

When a spindle (10) of a machine tool is rotated and moved relative to a workpiece linearly along an axis (Z) thereof during a machining process such as screw cutting, a spindle servomotor (12) and a feed servomotor (22), each of which is the primary drive, must be rotated synchronously. In general, the spindle servomotor directly drives the spindle without a reduction gear, and the feed servomotor feeds a spindle head (18) through reduction gears (26, 28). Therefore, in general, the synchronous work is controlled in accordance with an acceleration and deceleration capacity of the spindle servomotor. Consequently, the spindle servomotor is rotated along the torque limit curve line (L1, L2) to drive the spindle, to thereby effect the synchronous work at a high efficiency.

2 Claims, 2 Drawing Sheets

METHOD OF SYNCHRONOUS CONTROL OF SPINDLE MOTOR AND FEED MOTOR

DESCRIPTION

1. Technical Field

The present invention relates to a method of controlling an acceleration and deceleration of each of two motors for driving objects in each of two directions when machining is carried out while a rotational speed of a spindle of a machine tool and a relative translational speed between the spindle and a workpiece are synchronized. Accordingly, the present invention can be utilized as a method of synchronously controlling two motors to ensure that a screw pitch coincides with a rotation speed of a tool spindle and with a translation speed of the tool spindle relative to a workpiece during, for example, a tapping operation.

2. Background Art

In the prior art, a spindle motor driving a spindle and a feed servomotor feeding a spindle head are not always synchronized, even when a predetermined relationship should be established between a rotation of a tool spindle and a feed thereof in a straight line parallel to a central axis thereof, during a tapping operation. Instead, in this case, a spring is arranged at a mounting portion of the spindle to which a tool is attached, and an error of the translational feed speed, compared with the rotational speed against a screw pitch, is absorbed by the spring. However, a problem occurs in a ratchet mechanism etc. for converting a rotation of the feed servomotor to a linear motion to feed the spindle head along the central axis of the spindle, when the spindle motor is driven at a high rotational speed, and the accuracy of a machined screw is not always sufficient because the tapper tap is not fixed.

To solve this problem, a method of synchronously rotating the spindle motor driving the spindle and the feed servomotor feeding the spindle head is adopted. The acceleration of the feed servomotor feeding the spindle head is ten to twenty times higher than that of the spindle motor rotating the spindle, because the feed servomotor moves the spindle head linearly through the medium of a reduction gear, and generally, the spindle motor drives the spindle directly, not through a reduction gear. Consequently, the tapper tap is driven at the acceleration of the spindle motor having a lower acceleration, and under the condition of a constant torque, namely a constant acceleration or deceleration when two motors are rotated synchronously.

Nevertheless, the performance of the spindle motor is not always fully utilized in the synchronous operation under the above-mentioned condition of a constant torque, because a torque limit curve indicating a limit of an output torque versus a rotational speed of the spindle motor is not a constant level line. Therefore, there is still room for improvement from the view point of the efficiency of a machining process such as tapping.

DISCLOSURE OF THE INVENTION

Accordingly, an object of the present invention is to obtain an optimum improvement of the efficiency of a machining process and to reduce a time needed for machining a workpiece, to thereby solve the above-mentioned problem.

Considering the above-mentioned object, the present invention provides a method of synchronous control of a spindle servomotor and a feed servomotor during machining by synchronizing a rotational speed of a spindle of machine tool to be rotated by the spindle servomotor with a translational speed, which is a relative translational speed between the spindle and a workpiece to be moved by the feed servomotor, characterized in that the spindle servomotor and the feed servomotor are driven synchronously along a torque limit curve of the spindle servomotor.

The machining is carried out most efficiently when the spindle servomotor is used along the torque limit curve indicating a limited performance of a rotational acceleration thereof, even though an acceleration of the spindle servomotor when the spindle is rotated is less than that of the feed servomotor when the spindle is moved linearly.

BEST MODE OF CARRYING OUT THE INVENTION

Figure 4:
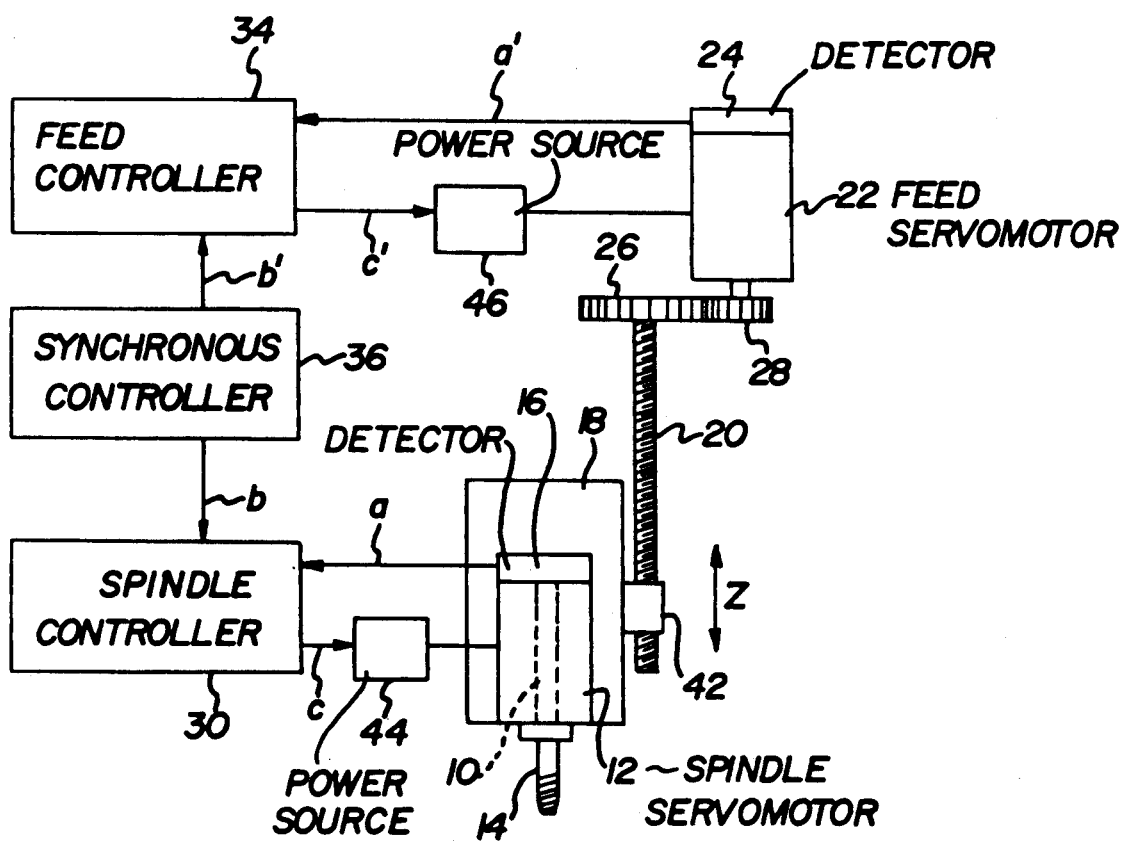
FIG. 4 is a schematic view showing a control system for synchronizing a spindle servomotor and a feed servomotor.

The present invention is described in more detail in the following in accordance with the embodiments shown in the attached drawings. Referring to FIG. 4, a built-in type spindle servomotor 12 is housed in a spindle head 18, and a tapper tap 14 for screw cutting is attached to the servomotor coaxially with a spindle 10, and accordingly, the tapper tap 14 is driven to rotate by the spindle servomotor. On the other hand, the spindle 10 can be moved with the spindle head 18 linearly along a central axis of the spindle 10, that is, along a direction Z, by the feed servomotor 22. The spindle head 18 can move smoothly and linearly along a ball screw shaft 20 extended along the direction Z through a ball nut 42 engaged with the ball screw shaft 20. A gear 26 is attached at one end of the ball screw shaft 20, and engaged with another gear 28 attached to an output shaft of the feed servomotor 22. Thus, the spindle 10 with the spindle head 18 is forced, by the feed servomotor 22 through a transmission mechanism having a deceleration function comprising the gears 28, 26, and the ball screw shaft 20, to move linearly along the direction Z.

A detector 16 or 24, for example, a tachometer or a pulse encoder, is attached to each motor 12 or 22 to detect a respective rotational speed thereof. A rotational speed a of the spindle 10 detected by the detector 16 is input to a spindle controller 30, which outputs a signal c to a power source 44 for the spindle servomotor 12. This signal is used to supply power in accordance with a difference between the actual rotational speed a and an instructed rotational speed b of the spindle 10 output by a synchronous controller 36 described later. Namely, a servo loop control of the spindle servomotor 12 is achieved by the detector 16 and the spindle controller 30.

A servo loop control of the feed servomotor 22 is also achieved by the detector 24 and a feed controller 34, similar to the above, to obtain a required rotational speed of the servomotor 22. The tapper tap 14 having a desired pitch must be rotated and moved linearly along the longitudinal direction thereof (Z direction) in accordance with the rotational speed when screw cutting is carried out, and therefore, the respective rotational speeds of the spindle servomotor 12 and the feed servomotor 22 must be controlled synchronously. The synchronous controller for this purpose is designated by a reference number 36. The above-mentioned feed controller 34 receives an instruction signal b' of a rotational speed output by the synchronous controller 36 and sends an instruction signal c' to a power source 46 to cause the power source to supply a required power to the feed servomotor 22, in accordance with a signal a' indicating a detected rotational speed of the speed servomotor 22 output by a detector 24. Such a spindle controller 30, feed controller 34, and synchronous controller 36 are well-known in the art and can be realized by a computer software program.

The feed servomotor 22 moves the spindle 10, that is, the tapper tap 14, linearly along the direction Z through the transmission mechanism 20, 26, 28 as described above, and the spindle servomotor 12 directly drives the tapper tap 14 to rotate same. A linear motion speed of the tapper top 14 can be provided by selecting an appropriate transmission mechanism for the translational mechanism linearly along the direction Z. The work by the spindle servomotor 12, however, for driving the tapper tap 14 to rotate is limited by only the performance of the spindle servomotor 12, because a transmission mechanism is not used when screw cutting is carried out. The efficiency of the work is controlled in accordance with the performance of the spindle servomotor 12, especially during screw cutting work requiring a large acceleration and deceleration of the tapper tap 14.

Figure 1:
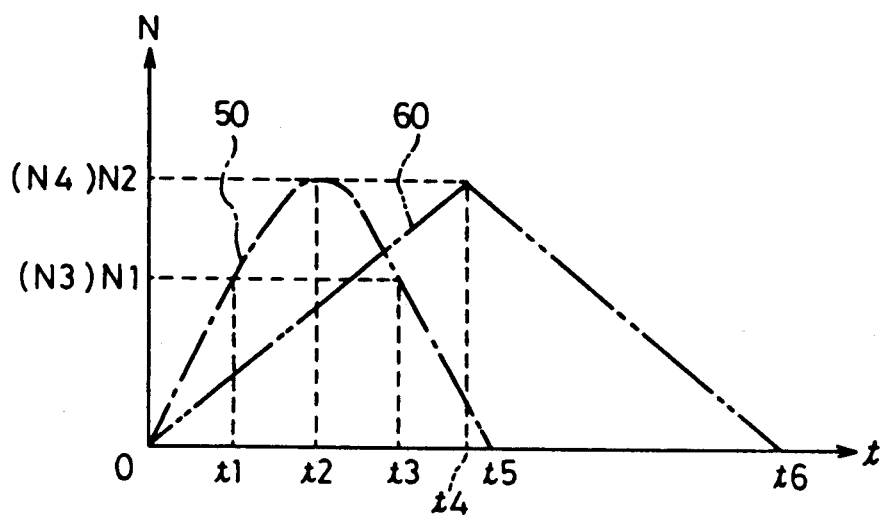
FIG. 1 is an explanation diagram comparing an acceleration and deceleration synchronous pattern according to the present invention with that of a prior pattern.
Figure 2:
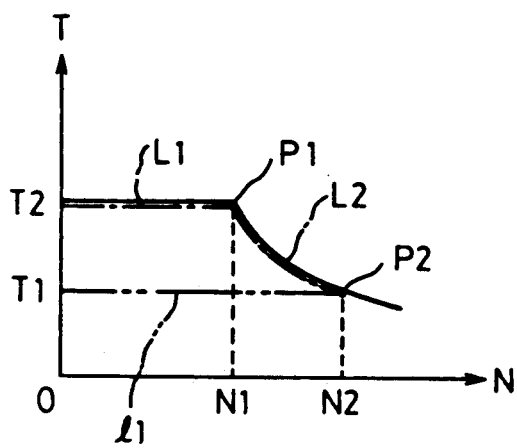
FIG. 2 is a diagram showing a torque control pattern when a spindle servomotor as the object of control is accelerated or decelerated.

In the prior art, the spindle servomotor is accelerated up to a speed N2 and decelerated under the condition of a constant torque T1 corresponding to a point P2, because the point P2 is a torque limit point as shown in FIG. 2, namely, under the condition of a constant acceleration as indicated by the two-dotted line l1 when screw cutting is affected at the rotational speed of a tool corresponding to the rotational speed N2 of the spindle servomotor. A change of the rotational speed N of the spindle servomotor versus a time t of the case is shown by a two-dotted line 60 in FIG. 1, which line comprises a linear increasing line and a linear decreasing line. On the other hand, a line showing that the feed servomotor for feeding the tool synchronously with the rotational speed of the tool is accelerated and decelerated is also designated by the two-dotted line 60 in FIG. 1. A torque T of this case is a constant T3 shown in FIG. 3, and a rotational speed of the feed servomotor is accelerated up to a speed N4 and decelerated under the condition indicated by a two-dotted line l2. The constant torque line l2 has sufficient allowance up to a torque limit line L0.

However, an allowance is found up to a torque limit curve line (designated by a solid line in FIG. 2) corresponding to the acceleration and deceleration performance of the spindle servomotor, when the spindle servomotor is controlled by the above-mentioned linear increasing and decreasing, and therefore, the spindle servomotor is controlled along the above-mentioned torque limit curve line as the upper limit of the acceleration and deceleration performance thereof, in accordance with the present invention, to thereby increase the efficiency of a work process, for example, screw cutting. Namely, the spindle servomotor is accelerated or decelerated along a straight line L1 having a constant torque value T2 and a hyperbola line L2 as shown in FIG. 2. An increasing and decreasing curve line of the case is designated by the one-dot line 50 in FIG. 1. The curve line 50 consists of a straight line up to a time t1 when a rotational speed N of the spindle servomotor reaches the speed N1 (up to the point P1 in FIG. 2) and a parabola line from the time t1 to a time t2 when the rotational speed N reaches the speed N2 (from the point P1 to the point P2 in FIG. 2). A remainder of the curve line 50, in a decreasing case, is symmetrical with respect to the time t2 in FIG. 1 because the line L1 is passed on after the curve line L2 in FIG. 2 in the case of a decrease. A time t3 corresponds to the point P1 in the case of a decrease.

The spindle servomotor is controlled along the lines L1 and L2 in FIG. 2, as described above, so that a torque T larger than that of the line l1 is always generated. Consequently, a time t5 up to the end of the increasing and decreasing line 50 in FIG. 1 is shorter than a time t6 up to the end of the linear increasing and decreasing line 60, as in the prior art, and accordingly, the work is affected rapidly and the efficiency thereof is high.

Figure 3:
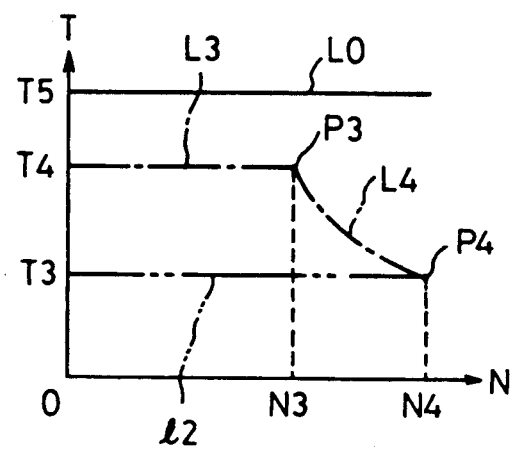
FIG. 3 is a diagram showing a torque control pattern when a feed servomotor as the object of control is accelerated or decelerated.

On the other hand, a torque versus speed curve line of the feed servomotor synchronized with the spindle servomotor is as shown by one-dot lines L3 and L4 in FIG. 3. The line L3 in a straight line having a torque T4, and the line L4 is a hyperbola line. A larger torque T is always generated along the lines L3 and L4 than a torque T3 generated along the line l2 as in the prior art, and the feed servomotor shows the same increasing and decreasing pattern as the spindle servomotor. Namely, the time t5 at the end of the increasing and decreasing line 50 of the present invention in the feed servomotor is shorter than the time t6 at the end of the linear increasing and decreasing line 60 in the prior art. Furthermore, a torque generated by the feed servomotor has an allowance up to the torque limit line L0 as recognized by FIG. 3.

Although the speeds of the servomotors are decreased as soon as a rotational speed of the spindle servomotor reaches the speed N2 and a rotational speed of the feed servomotor reaches the speed N4 in the above embodiment, each servomotor may be held at the rotational speed N2 or N4 for a desired time, to effect a screw cutting, and then decreased. It is obvious that the working time becomes shorter also in a synchronous control method similar to the above embodiment.

The spindle servomotor 12 can be controlled by a software program along the torque limit curve line when each torque limit curve line in FIGS. 2 and 3 is stored in a memory of a computer as part of the controllers in the present system.

As apparent from the foregoing description, according to the present invention, screw cutting can be affected even when the spindle servomotor for rotating a tool (a spindle) and the feed servomotor are accelerated or decelerated, because the two servomotors are always synchronized, and the work efficiency is maximized because the acceleration or deceleration capacity of the spindle servomotor is optimally utilized.

We claim:

1. A method of control of a spindle servomotor during machining, with a feed servomotor movably connected to the spindle servomotor such that the feed servomotor translationally moves the spindle servomotor along a longitudinal axis of the spindle servomotor, wherein the spindle servomotor has a torque limit versus rotational speed function curve represented by a straight line over a first speed range and a hyperbola over a second speed range, said method comprising the step of:

(a) detecting a rotational speed of the spindle servomotor;

(b) moving the spindle servomotor along a longitudinal axis with a translational speed determined by a speed of the feed servomotor; and (c) controlling the speed of the spindle servomotor in response to said torque limit function curve such that the spindle servomotor is accelerated over said first speed range along a straight line to have a constant torque and over said second speed range along a hyperbola line to have a decreasing torque so as to maintain a maximum torque of said spindle servomotor as said spindle is moved longitudinally.

2. A method of synchronous control of a spindle servomotor with a feed servomotor operated in a method according to claim 1, wherein said method includes the further step of:

(d) synchronizing rotation speed of said feed servomotor such that it drives a spindle head supporting said spindle servomotor to move translationally at a speed corresponding to rotational speed of said spindle servomotor.

* * * * *